(12) United States Patent
Menke (10) Patent No.: US 10,113,533 B2
(45) Date of Patent: Oct. 30, 2018

(54) SYSTEM AND METHOD FOR REDUCING WIND TURBINE OSCILLATIONS CAUSED BY GRID FAULTS

(71) Applicant: General Electric Company, Schenectady, NY (US)

(72) Inventor: Detlef Menke, Lotte (DE)

(73) Assignee: General Electric Company, Schenectady, NY (US)

( * ) Notice: Subject to any disclaimer, the term of this patent is extended or adjusted under 35 U.S.C. 154(b) by 397 days.

(21) Appl. No.: 14/478,234

(22) Filed: Sep. 5, 2014

(65) Prior Publication Data

US 2016/0069326 A1    Mar. 10, 2016

(51) Int. Cl.
*F03D 9/00* (2016.01)
*H02P 9/04* (2006.01)
*F03D 7/02* (2006.01)
*F03D 7/04* (2006.01)

(52) U.S. Cl.
CPC ......... *F03D 7/0284* (2013.01); *F03D 7/0296* (2013.01); *F03D 7/042* (2013.01); *Y02E 10/723* (2013.01)

(58) Field of Classification Search
CPC ...... F03D 9/003; F03D 7/0284; F03D 7/0296; F03D 7/042
USPC ..................................................... 290/44, 55
See application file for complete search history.

(56) References Cited

U.S. PATENT DOCUMENTS 7,432,686 B2   10/2008  Erdman et al.
7,911,072 B2    3/2011  Nyborg
8,432,055 B2    4/2013  Grbovic
2009/0174186 A1*  7/2009  Nyborg ................. F03D 7/0224
                                              290/44
2010/0219634 A1   9/2010  Arlaban et al.
2010/0283247 A1  11/2010  Krueger
(Continued)

FOREIGN PATENT DOCUMENTS

EP         2628947 A1    8/2013

OTHER PUBLICATIONS

Search Report and Opinion issued in connection with corresponding DK Application No. PA201570556 dated Jun. 23, 2016.
(Continued)

*Primary Examiner* — Tulsidas C Patel
*Assistant Examiner* — Thomas Quigley
(74) *Attorney, Agent, or Firm* — Dority & Manning, P.A.

(57) ABSTRACT

The present disclosure is directed to a system and method for operating a wind turbine in response to one or more grid events or faults occurring in a power grid. The method includes monitoring, via one or more sensors, a grid voltage of the power grid so as to detect one or more grid events occurring in the power grid. In response to detecting at least one grid event, a controller determines an operating catch point for the wind turbine component and applies a torque demand to the wind turbine component when the operating catch point is reached. Further, the torque demand may be based on an initial torque demand acting on the wind turbine component before the one or more grid events occurred. Therefore, applying the torque demand to the wind turbine component is configured to reduce oscillations occurring in the component caused by one or more grid faults.

17 Claims, 5 Drawing Sheets

(56) References Cited

U.S. PATENT DOCUMENTS

2011/0101927 A1  5/2011  Drobnjak et al.
2012/0150524 A1  6/2012  Nielsen et al.
2013/0207394 A1  8/2013  Banham-Hall et al.

OTHER PUBLICATIONS

Article—Grid Fault and Design-Basis for Wind Turbines—Final Report, Hansen et al., Jan. 2010, Risø DTU National Laboratory for Sustainable Energy.

* cited by examiner

SYSTEM AND METHOD FOR REDUCING WIND TURBINE OSCILLATIONS CAUSED BY GRID FAULTS

FIELD OF THE INVENTION

The present disclosure relates generally to wind turbines, and more particular to a system and method for reducing and/or preventing gaining of oscillations in a wind turbine caused by one or more grid faults.

BACKGROUND OF THE INVENTION

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

In order to supply power to the power grid, wind turbines need to conform to certain requirements. For example, wind turbines may need to offer fault-ride through (e.g. low-voltage ride through) capability, which requires a wind turbine to stay connected to the power grid during one or more grid faults. As used herein, the terms "grid fault," "fault," or similar are intended to cover a change in the magnitude of grid voltage for a certain time duration. For example, when a grid fault occurs, voltage in the system can decrease by a significant amount for a short duration (e.g. typically less than 500 milliseconds). In addition, grid faults may occur for a variety of reasons, including but not limited to a phase conductor being connected to ground (i.e. a ground fault), short circuiting between two or more phase conductors, lightning and/or wind storms, and/or a transmission line being connected to the ground by accident.

In the past, during these inadvertent faults, it has been acceptable for a wind turbine to be immediately disconnected whenever the voltage reduction occurs. However, as wind turbines continue to increase in size and penetration of wind turbines on the grid increases, it is desirable for the wind turbines to remain on line and ride through such disturbances. In addition, it is also important for the wind turbines to generate energy after the fault is cleared. Thus, many modern grids utilize auto-reclosing transmission lines that immediately close after a fault is detected so as to subsequently isolate the faulted section for a small time frame (e.g. 1 to 2 seconds). While the initial fault creates a zero or low voltage event, the isolation of the fault (i.e. from closing the transmission line) allows for rapid recovery of the grid voltage. With the auto-reclosing control scheme, however, the faulted line may be reconnected before the fault has cleared, thereby causing one or more subsequent faults. Such control technologies may result in undesirable oscillations in the wind turbine, e.g. in the drivetrain, thereby negatively impacting the lifecycle of the turbine or resulting in a trip of the wind turbine.

Therefore, it is desirable to provide a wind turbine having improved fault-ride through capability that addresses the aforementioned issues. For example, a wind turbine having improved fault-ride through capability that experiences fewer oscillations from one or more grid faults in the power grid would be advantageous.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a method for operating a wind turbine in response to one or more grid events in a power grid. The method includes monitoring, via one or more sensors, a grid voltage of the power grid so as to detect one or more grid events occurring in the power grid. In response to detecting one or more grid events occurring in the power grid, a controller determines an operating catch point for the wind turbine component and applies a torque demand to the wind turbine component when the operating catch point is reached. The operating catch point may include a generator speed, a rotor speed, a torque demand, a torque output, a generator position demand, or similar. Further, the torque or power demand may be based on an initial torque demand acting on the wind turbine component before the one or more grid events occurred. Therefore, applying the torque demand to the wind turbine component is configured to reduce oscillations of the component caused by one or more grid events so as to reduce oscillations of the wind turbine component.

In one embodiment, the method may also include determining the operating catch point of the wind turbine component as a function of an operating set point of the wind turbine component before the one or more grid events occurred. For example, in additional embodiments, the step of determining the operating catch point for the wind turbine component may include determining a natural frequency of the wind turbine component, and determining the operating catch point as a function of the natural frequency. In still another embodiment, the operating catch point may be calculated using a mathematic or computer model.

In a further embodiment, the step of applying the torque demand to the wind turbine component when the operating catch point is reached may further include a step of ramping a torque of the wind turbine component via the controller. In additional embodiments, the wind turbine component may include at least one of a generator, a main shaft, or a rotor.

In yet another embodiment, the one or more grid events may be indicative of an adverse voltage event occurring in the power grid. For example, in several embodiments, the adverse voltage event may include a low-voltage ride through (LVRT) event, a zero-voltage ride through (ZVRT) event, a high-voltage ride through event (HVRT), or any other voltage event.

In another aspect, the present disclosure is directed to a system for operating a wind turbine in response to one or more grid events in a power grid. The system includes one or more sensors configured to monitor a grid voltage of the power grid so as to detect one or more grid events occurring in the power grid. In response to detecting one or more grid events occurring in the power grid, a controller of the system is configured to determine an operating catch point for the wind turbine component and apply a torque demand to the wind turbine component when the operating catch point is reached so as to reduce oscillations of the wind turbine component. Further, the operating catch point may be based on an initial operating catch point of the wind turbine component before the one or more grid events occurred. It should also be understood that the system may further include any of the additional steps and/or features as described herein.

In yet another aspect, the present disclosure is directed to a method for controlling oscillations in a wind turbine caused by one or more grid events in a power grid. For example, in one embodiment, the method includes monitoring, via one or more sensors, an actual torque of a wind turbine component so as to detect one or more grid events occurring in the power grid. In response to detecting one or more grid events occurring in the power grid, the method includes determining an operating catch point for the wind turbine component and applying a torque demand to the wind turbine component when the operating catch point is reached. Further, the operating catch point is based on an operating set point of the wind turbine component before the one or more grid events occurred. It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for reducing or preventing the gaining of oscillations in a wind turbine caused by one or more grid events occurring at the power grid. More particularly, in one embodiment, one or more sensors continuously monitor the grid voltage of the power grid to detect for grid events. In another embodiment, the system may detect for grid events using the actual torque feedback from the wind turbine generator system. In response to detecting one or more grid events, a controller determines an operating catch point for a wind turbine component (e.g. the wind turbine generator) and applies a torque demand thereto when the operating catch point is reached. For example, in one embodiment, the controller determines a particular operating catch point for the wind turbine generator and applies a torque demand to the generator when said operating catch point is reached. In addition, the torque demand may be based on an initial torque demand acting on the generator before the one or more grid events occurred. Therefore, applying the torque demand reduces oscillations occurring in the component caused by one or more grid events.

Figure 1:
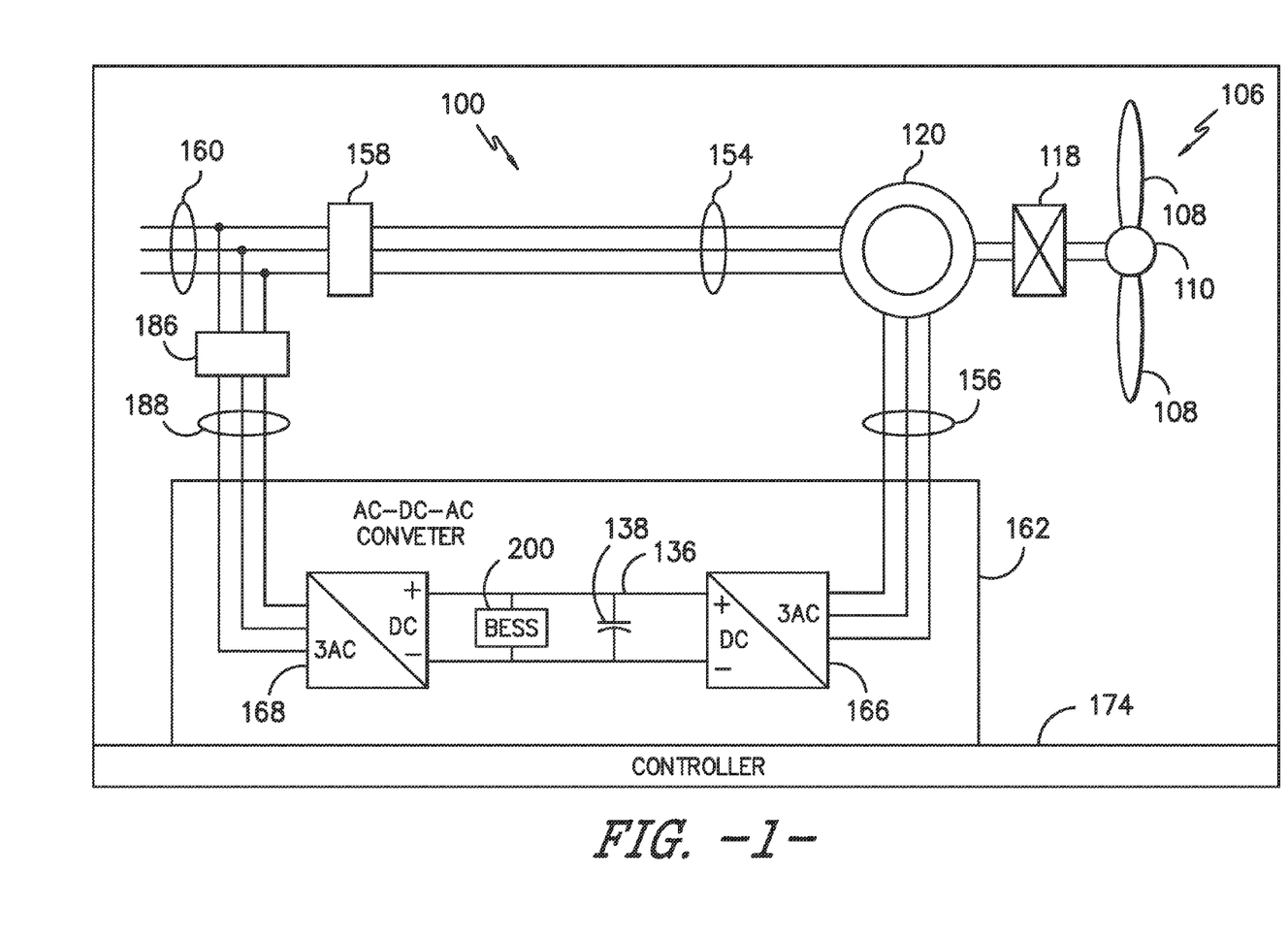
FIG. 1 illustrates one embodiment of an example wind turbine power system according to the present disclosure.

Referring now to the drawings, FIG. 1 illustrates an example wind driven doubly-fed induction generator (DFIG) system 100 according to one embodiment of the present disclosure. Example aspects of the present disclosure are discussed with reference to the DFIG wind turbine 10 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotatable hub 110, and together define a propeller. The propeller is coupled to an optional gearbox 118, which is, in turn, coupled to a generator 120. In accordance with aspects of the present disclosure, the generator 120 may be any suitable generator, including, but not limited to a doubly fed induction generator (DFIG) or a fully fed induction generator. The generator 120 is typically coupled to a stator bus 154 and a power converter 162 via a rotor bus 156. The stator bus 154 provides an output multiphase power (e.g. three-phase power) from a stator of the generator 120 and the rotor bus 156 provides an output multiphase power (e.g. three-phase power) of a rotor of the generator 120.

Referring to the power converter 162, the DFIG 120 is coupled via the rotor bus 156 to a rotor-side converter 166. The rotor-side converter 166 is coupled to a line-side converter 168 which in turn is coupled to a line-side bus 188. In example configurations, the rotor-side converter 166 and the line-side converter 168 are configured for normal operating mode in a three-phase, pulse width modulation (PWM) arrangement using insulated gate bipolar transistor (IGBT) switching elements. The rotor-side converter 166 and the line-side converter 168 can be coupled via a DC link 136 across which is the DC link capacitor 138.

Figure 2:
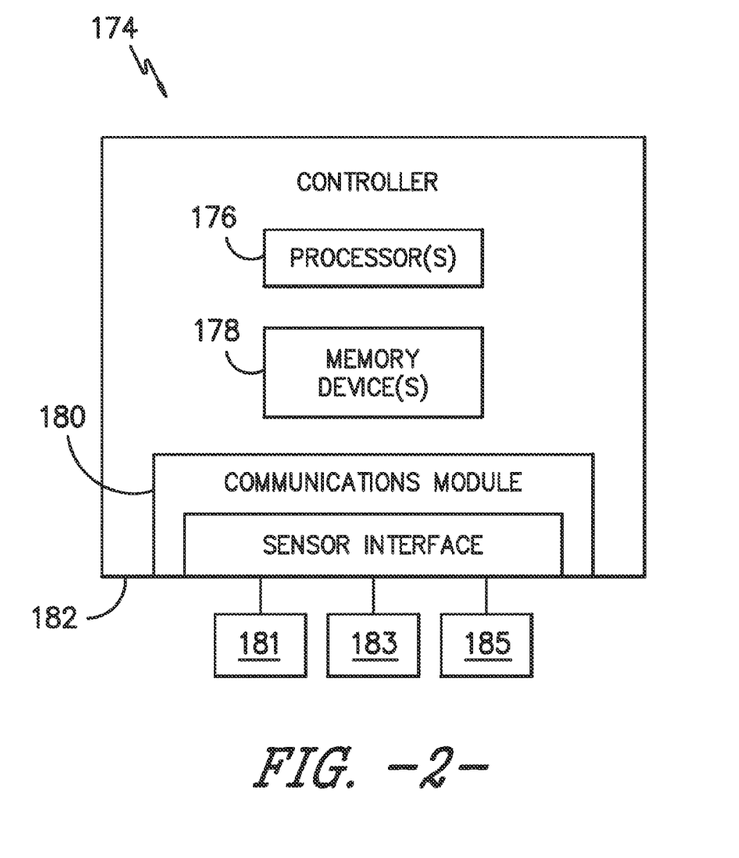
FIG. 2 illustrates a block diagram of one embodiment of a controller suitable for use with the wind turbine power system shown in FIG. 1.

The power system 100 may also include a controller 174 configured to control the operation of the various components of the system 100 as well as implementing any method steps as described herein. Thus, the controller 174 can include any number of control devices. In one implementation, as shown in FIG. 2, the controller 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands to the various system components. Additionally, the controller 174 may include a communications module 180 to facilitate communications between the controller 174 and the various components of the power system 100, e.g. any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g. sensors 181, 183, 185) may be communicatively coupled to the communications module 180 using any suitable means. For example, as shown, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the controller 174 to perform the various functions as described herein.

During operation, alternating current (AC) power generated at the DFIG 120 by rotation of the rotor 106 is provided via a dual path to an electrical grid 160. The dual paths are defined by the stator bus 154 and the rotor bus 156. On the rotor bus side 156, sinusoidal multi-phase (e.g. three-phase) AC power is provided to the power converter 162. The rotor-side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the electrical grid 160. In particular, switching elements (e.g. IGBTs) used in bridge circuits of the line-side power converter 168 can be modulated to convert the DC power on the DC link 136 into AC power on the line-side bus 188. The AC power from the power converter 162 can be combined with the power from the stator of the DFIG 120 to provide multi-phase power (e.g. three-phase power) having a frequency maintained substantially at the frequency of the electrical grid 160 (e.g. 50 Hz/60 Hz).

Various circuit breakers and switches, such as a converter breaker 186, can be included in the power system 100 to connect or disconnect corresponding buses, for example, when current flow is excessive and can damage components of the system 100 or for other operational considerations. Additional protection components can also be included in the power system 100.

Still referring to FIG. 1, the power system 100 may also include a battery energy storage system (BESS) 200 coupled to the power converter 162. More specifically, as shown in the illustrated embodiment, the BESS 200 can be connected in parallel with the DC link 136 of the power converter 162. The battery energy storage system 200 can be used to provide power to the DC link 136 under certain conditions. For instance, the BESS 200 can be used to provide power to the DC link 136 to increase output of the power system 100 when wind speed drops. Power can also be supplied and stored in the BESS 200 during operation of the power system 100.

Figure 3:
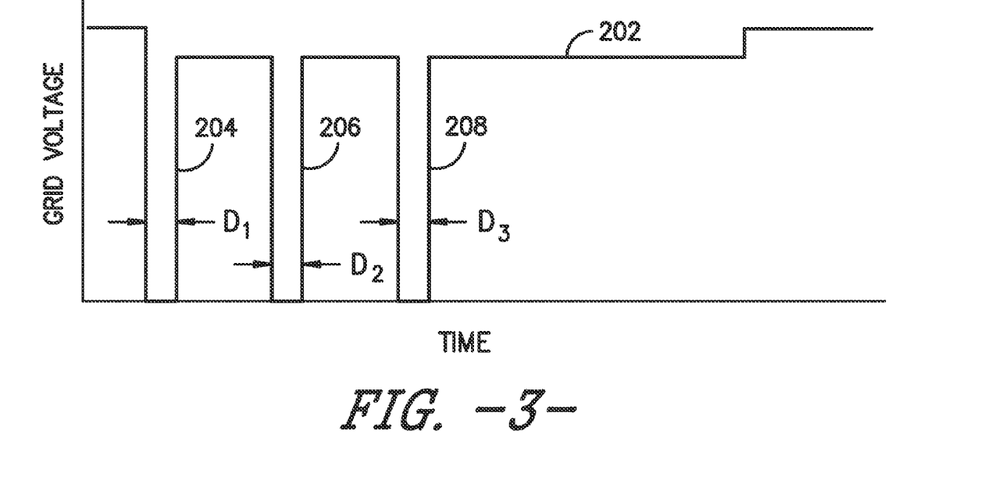
FIG. 3 illustrates a graph of one embodiment of power grid voltage versus time, particularly illustrating multiple grid events occurring at the power grid, according to the present disclosure.

The sensors 181, 183, 185 as described herein are configured to continuously monitor a grid voltage of the power grid 160. For example, as shown in the graph of FIG. 3, a grid voltage signal 202 of the power grid (y-axis) versus time (x-axis) is illustrated. During operation of the power system 100, if the power grid 160 experiences one or more grid events or faults 204, 206, 208, the grid 160 is configured to use auto-reclosing of the transmission lines immediately following the grid fault(s) and subsequent isolation of the faulted section for a small duration of time (e.g. $D_1$, $D_2$, and $D_3$). For example, as shown in FIG. 3, the initial fault 204 creates a zero/low voltage event, and the isolation of the fault 204 allows rapid recovery of the grid voltage. With the auto-reclosing scheme, however, the previously faulted section may be connected back to the grid 160 even if the fault has yet to clear, thereby causing subsequent zero/low voltage events 206, 208. Therefore, the present disclosure improves the fault ride-through capability of the wind turbine 100 such that the turbine 100 is capable of riding through at least three grid events 204, 206, 208 with a 1.5 second gap between closures and the start of the next event as shown. In addition, for each of the grid events 204, 206, 208, the voltage can be assumed to have recovered 80% of the nominal grid voltage prior to another reclosing event and dropped to 0% during reclosing.

Figure 4:
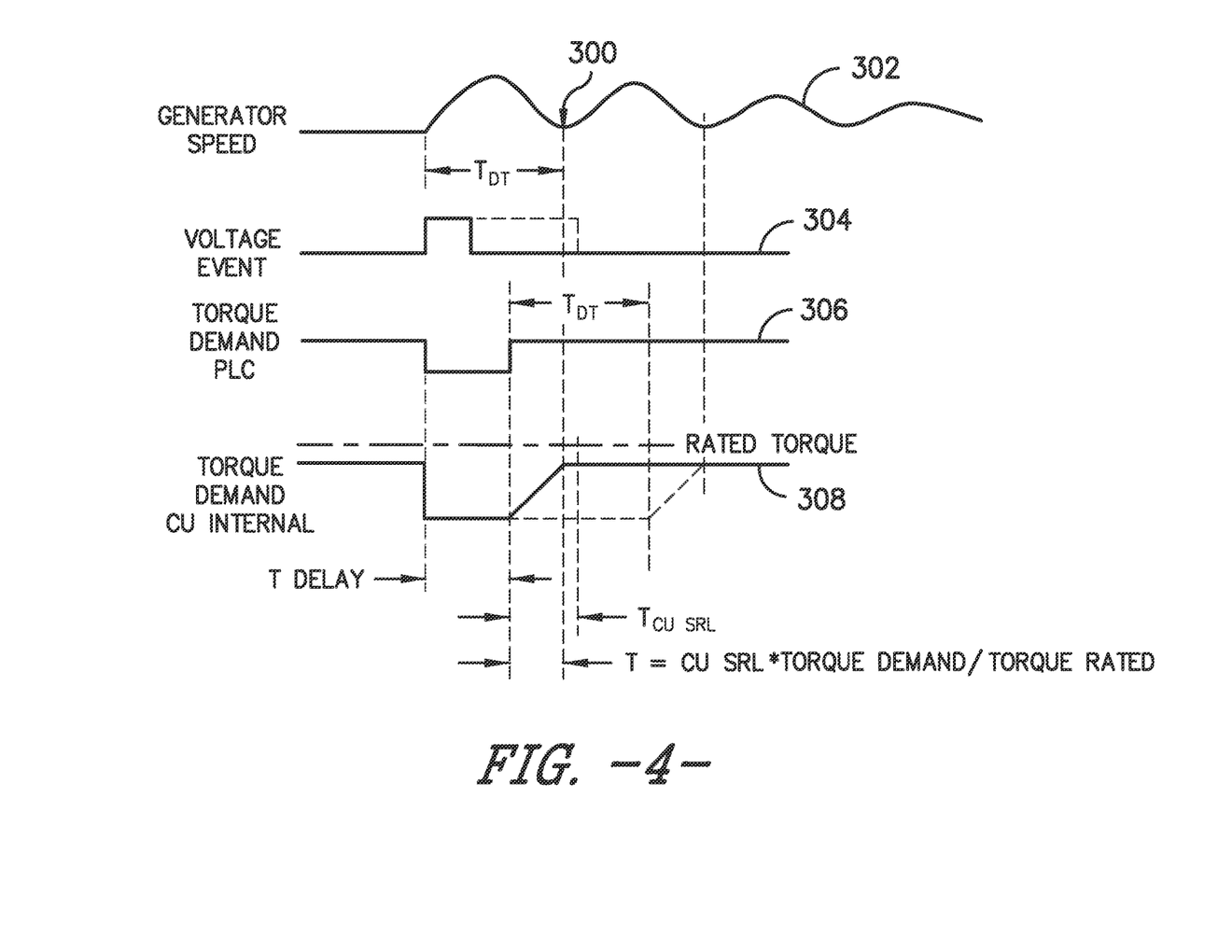
FIG. 4 illustrates a graph of one embodiment of a voltage event occurring at the power grid, particularly illustrating the generator speed and torque demand both before and after the voltage event, according to present disclosure.

After the occurrence of one or more grid events (e.g. such as those illustrated in FIG. 3), the controller 174 is configured to implement a control logic so as to reduce oscillations in the wind turbine drivetrain that may be caused by the grid faults in the power grid 160. For example, the controller 174 is configured to determine an "operating catch point" for the wind turbine component (e.g. the generator 120). More specifically, as shown in FIG. 4, the operating catch point 300 may correspond to a particular generator speed 302 value. In still further embodiments, the operating catch point may correspond to any suitable operating condition at a certain moment in time. For example, in the illustrated embodiment, the generator speed 302 is continuously monitored and if a grid event is detected, the controller 174

"catches" the generator speed that closely matches a generator speed of the generator 120 before the event occurred. In addition, the catch point 300 may be determined using a variety of methods. For example, in one embodiment, if the natural frequency (e.g. the eigenfrequency) of the wind turbine component (e.g. the generator 120) is known, then the catch point 300 may be a function of the natural frequency. More specifically, the catch point 300 may be equal to the inverse of the natural frequency after the event occurs. In another embodiment, the sensors 181, 183, 185 may detect the optimal catch point 300 based on an operating point (e.g. the torque may be measured directly at the main shaft and the applied at the time when the lowest oscillation increase is expected). In still further embodiments, the controller 174 may determine or estimate the catch point using a mathematical or computer model. For example, in one embodiment, the controller 174 may include a mathematic model of the drivetrain. Such a model can utilize one or more environmental signals, e.g. generator speed, torque, temperature, etc., to calculate the operating catch point 300.

The controller 174 then implements a control action (e.g. a torque demand) to the wind turbine component (e.g. the generator 120) when the catch point 300 is reached. The control action may be any suitable control action so as to reduce oscillations of the wind turbine component, including, but not limited to a certain torque demand, a pitch adjustment, a yaw adjustment, a speed set point, or similar. More specifically, as shown in FIG. 4, the controller 174 applies the torque demand to the generator 120 that was acting on the generator 120 before the grid event occurred when the catch point is reached (line 308). More specifically, after the grid event occurs (i.e. after $T_{DELAY}$), the torque drops and the controller 174 ramps the torque 308 of the converter unit (CU INTERNAL) according to the torque demand 306 of the controller 174 or PLC (i.e. programmable logic controller). In certain embodiments, the torque demand 306 is based on an initial torque demand acting on the wind turbine component before the one or more grid events occur. In addition, as shown, $T_{CU\_SRL}$ represents Slew Rate Limiter (SRL) inside the Converter Unit, where T is the time that is needed to move from the actual torque to the operating catch point 300 value, due to the SRL.

Figure 5:
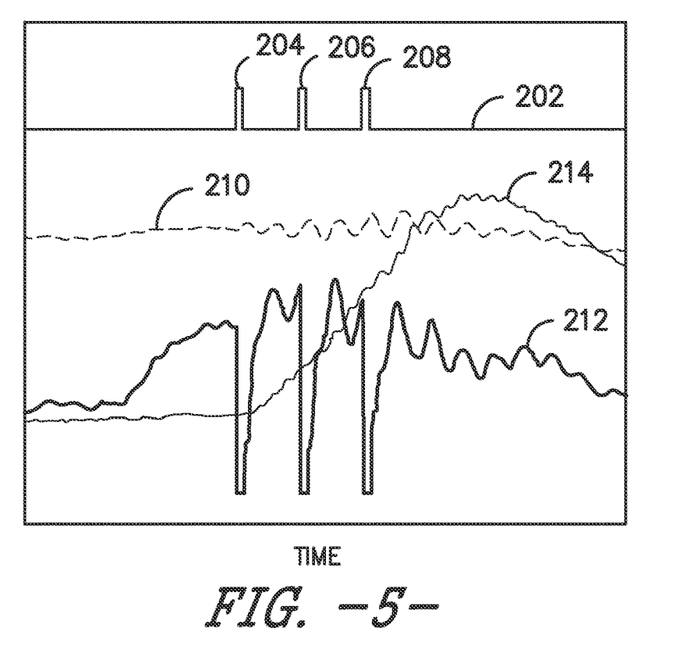
FIG. 5 illustrates a graph of one embodiment of multiple grid events occurring at the power grid, particularly illustrating the generator speed and torque demand both before and after the voltage event, according to conventional construction.
Figure 6:
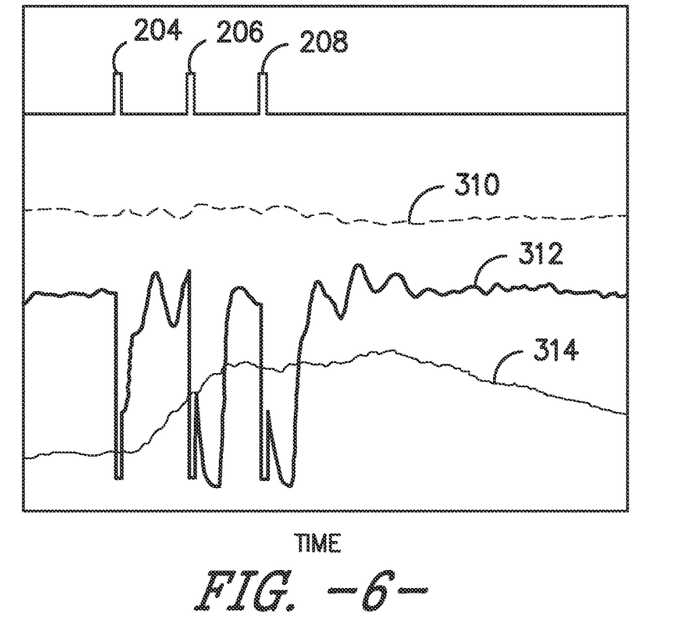
FIG. 6 illustrates a graph of one embodiment of multiple grid events occurring at the power grid, particularly illustrating the generator speed and torque demand both before and after the voltage event, according to present disclosure; and, FIG. 7 illustrates a flow diagram of one embodiment of a method for reducing or preventing the gaining of oscillations in a wind turbine caused by multiple grid faults in a power grid according to the present disclosure.

Referring now to FIGS. 5 and 6, a plurality of graphs is illustrated, particularly illustrating the generator speed oscillation and torque demand both before and after multiple grid events occurs at the power grid 160. More specifically, each graph illustrates the oscillation 214, 314 and amplitude 210, 310 of the generator 120, respectively, before and after the occurrence of the grid events 204, 206, 206. FIG. 5 illustrates the generator speed oscillation 210 and torque demand 212 before and after multiple grid events occurs at the power grid 160 according to conventional construction, whereas FIG. 6 illustrates the generator speed oscillation 310 and torque demand 312 before and after the voltage event according to present disclosure so as to illustrate various benefits of the present disclosure. As shown, the conventional embodiment of FIG. 5 results in drivetrain vibrations which can trip the wind turbine and have a negative impact on the life cycle of thereof. In addition, after the occurrence of the grid events 204, 206, 208, the oscillation 214 of the generator of the conventional embodiment (FIG. 5) is substantially higher than the oscillation 314 of the generator according to the present disclosure (FIG. 6).

Figure 7:
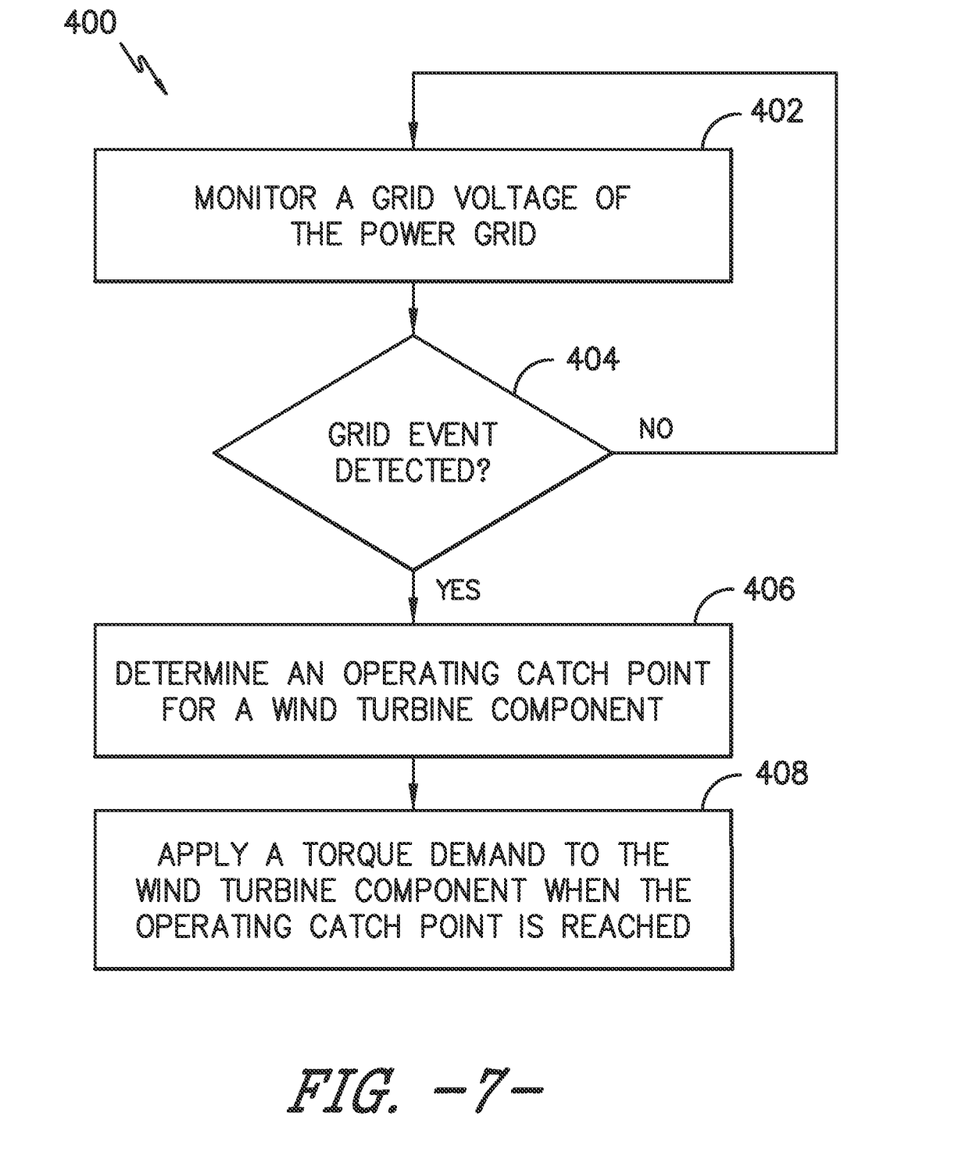

Referring now to FIG. 7, a flow diagram of one embodiment of a method 400 for reducing oscillations in a wind turbine caused by multiple grid events in a power grid according to the present disclosure is illustrated. As shown, the method 400 includes monitoring a grid voltage of the power grid so as to detect one or more grid events occurring in the power grid (step 402). In another embodiment, the sensors may monitor the torque of the generator to detect for one or more grid events. If a grid event(s) is detected, (step 404), then the controller is configured to determine a catch point for a wind turbine component (step 406). For example, in one embodiment, the controller determines a catch point for the generator speed. In addition, the controller applies a torque demand to the wind turbine component (e.g. the generator) when the catch point is reached (step 408) so as to reduce oscillations in the wind turbine (i.e. within the generator). Further, the torque demand is based on an initial torque demand acting on the wind turbine component before the one or more grid events occurred.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine in response to one or more grid events occurring in a power grid, the method comprising:

monitoring, via one or more sensors, a grid voltage of the power grid so as to detect one or more grid events occurring in the power grid;

in response to detecting one or more grid events occurring in the power grid, determining, via a controller, an operating catch point for a wind turbine component as a function of an inverse of a natural frequency of the wind turbine component after the one or more grid events occurred such that the operating catch point equals an operating condition of the wind turbine at a predetermined moment in time before the one or more grid events occurred in the power grid, the operating catch point comprising at least one of a generator speed, a rotor speed, a torque demand, a torque output, or a generator position demand; and applying a torque demand to the wind turbine component when the operating catch point is reached so as to reduce oscillations of the wind turbine component, wherein the torque demand is equal to an initial torque demand acting on the wind turbine component before the one or more grid events occurred.

2. The method of claim 1, further comprising determining the operating catch point of the wind turbine component as a function of an operating set point of the wind turbine component before the one or more grid events occurred.

3. The method of claim 1, wherein determining the operating catch point for the wind turbine component further comprises utilizing a mathematic model to calculate the operating catch point.

4. The method of claim 1, wherein applying the torque demand to the wind turbine component when the operating catch point is reached further comprises ramping a torque of the wind turbine component via the controller.

5. The method of claim 1, wherein the one or more grid events are indicative of an adverse voltage event occurring in the power grid.

6. The method of claim 5, wherein the adverse voltage event comprises at least one of a low-voltage ride through (LVRT) event, a zero-voltage ride through (ZVRT) event, or a high-voltage ride through event (HVRT).

7. The method of claim 1, wherein the wind turbine component comprises at least one of a generator, a main shaft, or a rotor.

8. A system for operating a wind turbine in response to one or more grid events in a power grid, the system comprising:

one or more sensors configured to monitor a grid voltage of the power grid so as to detect one or more grid events occurring in the power grid; and, a controller communicatively coupled to the one or more sensors, the controller configured to perform one or more operations, the operations comprising:

in response to detecting one or more grid events occurring in the power grid, determining an operating catch point for the wind turbine component as a function of an inverse of a natural frequency of the wind turbine component after the one or more grid events occurred such that the operating catch point equals an operating condition of the wind turbine at a predetermined moment in time before the one or more grid events occurred in the power grid, the operating catch point comprising at least one of a generator speed, a rotor speed, a torque demand, a torque output, or a generator position demand; and implementing a control action to the wind turbine component when the operating catch point is reached so as to reduce oscillations of the wind turbine component, wherein the control action comprises a torque demand equal to an initial torque demand acting on the wind turbine component before the one or more grid events occurred.

9. The system of claim 8, wherein the operating catch point is based on an operating set point of the wind turbine component before the one or more grid events occurred.

10. The system of claim 8, wherein determining the operating catch point for the wind turbine component further comprises utilizing a mathematic model to calculate the operating catch point.

11. The system of claim 8, wherein the one or more grid events are indicative of an adverse voltage event occurring in the power grid.

12. The system of claim 11, wherein the adverse voltage event comprises at least one of a low-voltage ride through (LVRT) event, a zero-voltage ride through (ZVRT) event, or a high-voltage ride through event (HVRT).

13. The system of claim 8, wherein the wind turbine component comprises at least one of a generator, a main shaft, or a rotor.

14. A method for controlling oscillations in a wind turbine caused by one or more grid events in a power grid, the method comprising:

monitoring, via one or more sensors, an actual torque of a wind turbine component so as to detect one or more grid events occurring in the power grid;

in response to detecting one or more grid events occurring in the power grid, determining, via a controller, an operating catch point for the wind turbine component as a function of an inverse of a natural frequency of the wind turbine component after the one or more grid events occurred such that the operating catch point equals an operating condition of the wind turbine at a predetermined moment in time before the one or more grid events occurred in the power grid, the operating catch point comprising at least one of a generator speed, a rotor speed, a torque demand, a torque output, or a generator position demand; and applying a torque demand to the wind turbine component when the operating catch point is reached, wherein the torque demand is equal to an initial torque demand acting on the wind turbine component before the one or more grid events occurred.

15. The method of claim 1, wherein the natural frequency corresponds to an eigenfrequency of the wind turbine component after the one or more grid events occurred.

16. The method of claim 8, wherein the natural frequency corresponds to an eigenfrequency of the wind turbine component after the one or more grid events occurred.

17. The method of claim 14, wherein the natural frequency corresponds to an eigenfrequency of the wind turbine component after the one or more grid events occurred.

* * * * *